Figure 1:
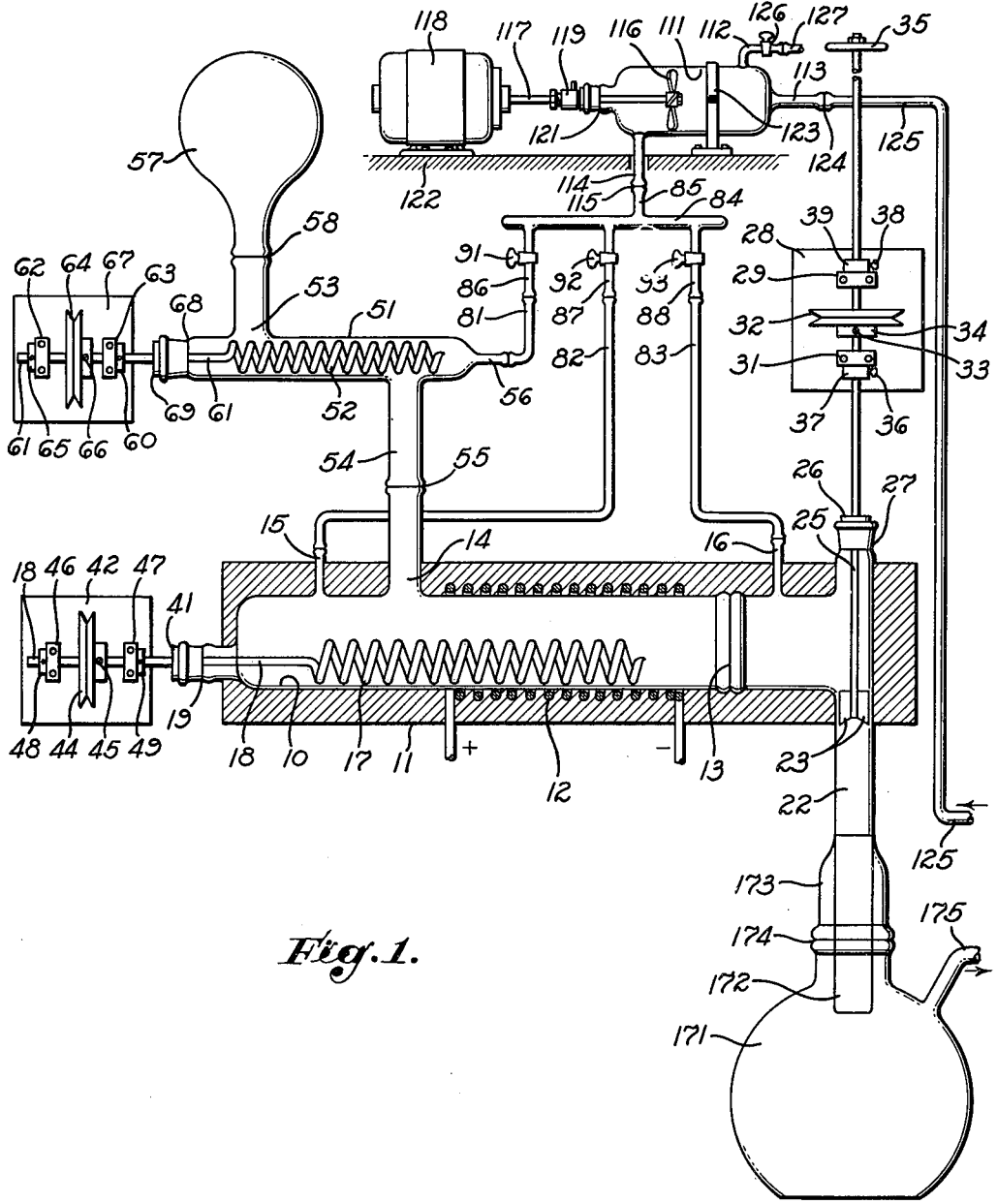

INVENTORS.
ALBERT D. WEBB
HUGH P. KYLE
ATTORNEY.

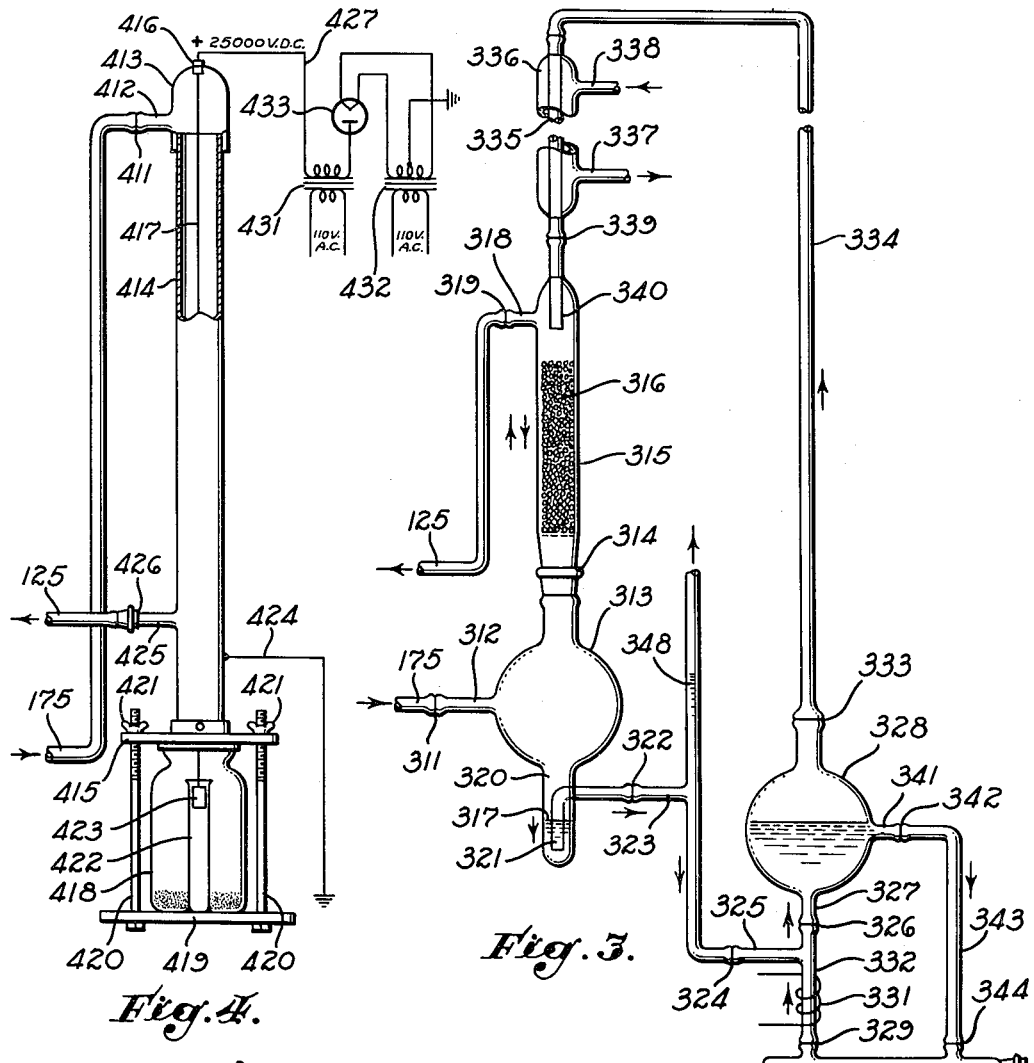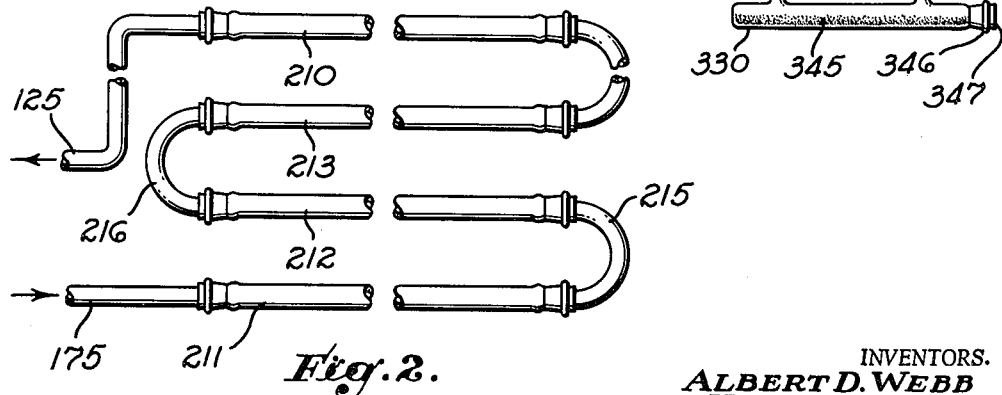

United States Patent Office 2,743,158
Patented Apr. 24, 1956

2,743,158
PROCESS FOR PRODUCING URANIUM PENTACHLORIDE

Albert D. Webb, Oak Ridge, Tenn., and Hugh P. Kyle, Los Altos, Calif., assignors to the United States of America as represented by the United States Atomic Energy Commission Application May 26, 1944, Serial No. 537,524

11 Claims. (Cl. 23—14.5)

This invention relates to the manufacture of uranium pentachloride, especially by a continuous process. More particularly, it appertains to the conversion of uranium tetrachloride to uranium pentachloride by sending a stream of such material in granulous form through a heated zone in an environment of chlorine.

A need for large quantities of uranium pentachloride exists in industry. Each of the processes heretofore available for its preparation was unsatisfactory for one or more reasons, such as being wasteful of reactants, being difficult to carry out, being inconveniently slow, being a batchwise operation and giving undesirably low percentages of conversion.

This invention has for an object the continuous production of uranium pentachloride. Other objects are to decrease the time required to produce uranium pentachloride, to improve the yields in the manufacture of uranium pentachloride, to increase the purity of uranium pentachloride obtained in large-scale manufacturing processes, to produce uranium pentachloride more economically, to decrease the loss of final product in the manufacture of uranium pentachloride, to increase the production rate in the manufacture of uranium pentachloride, to obtain a maximum heat transfer in the conversion of uranium compounds to uranium pentachloride, to increase the yield per unit volume of reactor unit in the chlorination of a lower uranium chloride to uranium pentachloride, to provide maximum reaction surface in the conversion of uranium tetrachloride to uranium pentachloride, to transport uranium pentachloride away from the reaction zone as fast as it is formed, to chlorinate uranium tetrachloride to uranium pentachloride, to react chlorine with uranium tetrachloride to form uranium pentachloride, to secure optimum chlorine velocity in the chlorination of uranium tetrachloride, to recirculate chlorine gas in the process of chlorinating uranium tetrachloride to uranium pentachloride, to remove solid particles from the exit gas in the chlorination of uranium tetrachloride to uranium pentachloride, to convert uranium tetrachloride to uranium pentachloride in glass apparatus, and to simplify the apparatus required in the production of uranium pentachloride. A general advance in the art and other objects which will appear hereinafter are also contemplated.

A process has now been discovered and apparatus designed whereby the operations of chlorinating uranium tetrachloride to uranium pentachloride, separating the solid particles from the noncondensing gases issuing from the reaction zone and recirculating the unused chlorinating gas can be carried out easily, economically and expeditiously.

How the foregoing objects and related ends are accomplished will be apparent from the following exposition in which are disclosed the principle, the organization and divers embodiments of the invention, including the best mode contemplated for carrying out the same. Parts are given by weight throughout the written description which is amplified by the accompanying drawings, in which Figure 1 is a diagrammatic side elevation view, partly in section, of the reaction vessel and its associated feeding mechanism and collector for the final product; Fig. 2 is a diagrammatic side elevation view, partly in section, of one form of apparatus for eliminating the uranium pentachloride, in the form of a dust, from the gas leaving the collector before recirculation of the chlorine gas through the reaction zone; Fig. 3 is a diagrammatic side elevation view, partly in section, of a modified form of apparatus for separating the solid particles from the unused chlorinating gas before recirculation of the same through the reaction chamber; and Fig. 4 is a diagrammatic side elevation view, partly in section, of another modified form of apparatus for separating the fine particles from the chlorine before recirculation of the same over fresh quantities of uranium tetrachloride.

The apparatus employed comprises a reaction vessel embodying means for propelling the granulous uranium tetrachloride being treated along the reaction vessel, a feeder embodying means for supplying a continuous stream of uranium tetrachloride to the reaction vessel, a blower for producing a flow of chlorinating gas through the apparatus, a receiver for the reaction product, $UCl_5$, and a dust collector for separating the fine solid particles from the gases issuing from the receiver.

Referring now to Fig. 1 of the drawing, the reaction vessel comprises a horizontal tube 10 constructed of glass or other chlorine-resistant material, about which is set a heater 11. The heater illustrated is of the electric resistance type having a heating coil 12. The tube 10 has a gastight ground glass joint 13 to facilitate assembling, cleaning, etc. The reaction vessel has an adit 14 for the pulverulent raw material (uranium tetrachloride) and adits 15 and 16 for chlorine or other chlorinating gas. These adits or ducts are, preferably, tubular extensions of the tube 10.

Operating inside the reaction vessel to plow and propel the granulous material along the reaction zone is a helix 17, preferably of some material such as glass which is not affected by the reactants. The helix 17 is integral with or otherwise rigidly secured to a shaft 18 and is rotated thereby. The shaft 18 extends through a tubular extension 19 and a plug 41. The plug 41 filling the space between the shaft 18 and the sidewall closes the mouth of the extension 19 in a gastight manner. The bearing surfaces are pressure lubricated. The granulous uranium tetrachloride, advanced by the helix 17 into the heated reaction zone, is converted to uranium pentachloride which leaves the reaction zone in vaporous form and, upon cooling, forms solid particles which fall by gravity from the reaction vessels through an exit or delivery tube 22.

A pulley 44 fixed in position by a set screw 45 threaded through its hub onto the shaft 18 and operated by a belt (not shown) rotates the helix 17. The shaft 18 is supported by two bearings 46 and 47 and positioned laterally therein by two collars 48 and 49. The bearings 46 and 47 are bolted to a fixed support 42.

To prevent clogging of the exit 22 by material sticking to the inner walls thereof, a rotating scraper device comprising a series of blades 23 carried on a vertical rod or shaft 25 is provided. A plug 26 serves as a guide for the rod 25 and as a gastight closure for the mouth of a tubular extension 27 of the reaction vessel. A fixed support 28 carries two bearings 29 and 31 for the shaft 25. A pulley 32 located between these bearings and operated by a belt (not shown) rotates the scraper. This pulley is secured by a set screw 33 threaded through its hub onto the shaft. The spacing of the pulley and bearings is such that the scraper can be lifted entirely out of the delivery tube 22 when desired. The scraper is vertically adjustable by means of a manual grip or hand wheel 35. It is held in any desired position by thrust collars 37 and 39. Thumb screws 36 and 38 permit easy release of these collars for vertical adjustment of the scraper.

In order to provide continuous and regulated flow of uranium tetrachloride into the reaction vessel, a hopper or feeder device embodying a helical impeller is used. This feeding device comprises a tube 51 of glass or other chlorine-resistant material in which a helix 52 of similar material rotates. This screw-conveyor-like forwarding device receives the raw material from an adit tube 53 and transmits it to an exit tube or duct 54. This tube 54 is connected in a gastight manner to the adit 14 at a joint 55. Chlorine gas enters the tube 51 through a tubular extension 56 and flows concurrent with the raw material into the reactor and keeps a satisfactory environment in this part of the apparatus. The incoming mass of uranium tetrachloride hinders or precludes escape of the chlorine through the adit 53.

The raw material is supplied in containers such as 57, which, when empty, can be detached and replaced by means of a connection 58 without interrupting the flow of raw material into the reaction chamber 11.

The operating arrangement for the helix 52 is similar to that associated with the helix 17. It comprises a shaft 61, journaled in bearings 62 and 63. These bearings are bolted to a support 67. The shaft 61 which supports and rotates the helix 52 is, in turn, operated by a pulley 64 whose hub is affixed thereto by a set screw 66. The shaft 61 operates through a tubular extension 68 and is positioned laterally by collars 60 and 65. It is sealed in by a plug 69, the bearing surface of which is pressure lubricated.

Material from the reaction chamber 11 passing into the tube 22 is collected in a receiver 171. The lower end of the tube 22 forms a spout 172 which extends into the receiver. A gastight seal between the receiver and the delivery tube is secured by means of a hood 173 on the tube which connects with the receiver at a joint 174. Volatile material leaving the reaction chamber passes through the same channel as the nongaseous material. Egress of volatile material from the receiver 171 is through an extension tube 175.

Chlorine gas entering the reaction vessel through the tubes 15 and 16 and that entering the feeder through the tube 56 comes through lines 81, 82 and 83 which are connected with a manifold device 84 comprising an adit line 85 and exit lines 86, 87 and 88. Incorporated in these exit lines are cocks or valves 91, 92 and 93 for the purpose of controlling the amount and velocity of gas entering the various zones of the reaction vessel.

A blower 111 forces chlorine gas under pressure through the previously described distribution system into the reaction vessel. This blower 111 has tubular adits 112 and 113 through which it is supplied with chlorine. It delivers the chlorine through an exit tube 114 to the adit 85 of the manifold with which it connects at a joint 115. The preferred blower is a simple device comprising essentially a cylindrical glass chamber in which a closely fitting fan 116 rotates. A four-bladed fan has been found most satisfactory. The fan 116 is mounted on a shaft 117 which is rotated by a motor 118, the shaft 117 projecting through a conventional Wilson seal 119. This seal closes the mouth of a tubular extension 121 through which the shaft 117 operates. The blower 111 is securely held in a frame 123 comprising a bracket and a strap. The frame 123 and the motor 118 are bolted to a support 122. The adit 113 at a joint 124 connects with a line 125 containing chlorine gas to be recirculated. The adit 112 connects with a line 127 which supplies makeup chlorine to replace that consumed in the reaction vessel, the amount admitted being regulated by a cock 126.

Referring now to Fig. 2, it will be seen that the line 175 by which the current of chlorine gas leaves the receiver 171 is connected with a horizontal tube settling device. The fluid stream from the tube 175 passes through a series of tubes 210, 211, 212 and 213 connected by U-tubes such as 215 and 216 into the line 125 which is connected to the intake side of the pump 111. The diameter of the horizontal tubes and the length of the path the chlorine gas travels is adjusted so that the UCl₅ dust particles settle out. The horizontal tubes are ordinarily cylindrical and about two inches in diameter.

In the somewhat more intricate scrubbing device shown in Fig. 3 the line 175 from the receiver 171 is connected at 311 with an extension 312 on a vessel 313 serving as a sump. This vessel at 314 is connected with a scrubber 315 containing a loose packing 316 of glass beads or some similar chlorine-resistant material. The UCl₅ dust laden chlorine gas passing up this scrubber flows counter to a suitable scrubbing liquid such as carbon tetrachloride, which is preferred, or an equivalent, for example, symmetrical dichlorethane, dripping through the packing. The downwardly flowing liquid scrubs the gas, removing and carrying the uranium pentachloride into a pool of liquid 317 at the bottom of the vessel 313. The purified chlorine gas passes through an extension tube 318 and a joint 319 into the pump intake line 125.

A tubular extension 320 in cooperation with a tube 321 forms a trap at the bottom of the vessel 313. The carbon tetrachloride carries the separated uranium pentachloride through this trap and a joint 322 into a line 323, having a standpipe 348 which is vented to the atmosphere, and thence through a joint 324 into a T-tube 325. The tube 325 is joined at a connection 326 to an extension 327 on the bottom of a carbon tetrachloride boiler 328. It also joins, through a connection 329, a uranium pentachloride collector 330. A heater 331 illustrated as a resistance heater coil is set about a vertical arm 332. Heat applied in this locality causes vaporization of the carbon tetrachloride in the boiler 328.

This boiler is connected at a joint 333 to a line 334 which carries the carbon tetrachloride vapors into a condenser tube 335. This tube, surrounded by a casing 336 and having an inlet 338 and an outlet 337 for a cooling fluid such as water, condenses the carbon tetrachloride. The condensed liquid passes through a connection 339 and a spout 340 onto the packing in the scrubber 315.

The application of heat by the heater 331 causes convection currents in the body of liquid carbon tetrachloride, causing it to circulate through a lateral extension 341, a connection 342, a line 343, a connection 344 and the collector 330, and back to the heated zone in tube 332.

The uranium pentachloride settles out as indicated at 345 in the bottom of the collector 330 from which it is removed from time to time through an opening 346 which is normally closed by a plug 347. The supply of carbon tetrachloride may be replenished through the standpipe 348 when necessary. In large-scale operations, a condenser (not shown) is connected between the extension 318 and the line 125 to recover carbon tetrachloride vapors which would otherwise travel along with the chlorine gas which is being recirculated.

An electrostatic type of dust separator is illustrated in Fig. 4. These devices are well known in the art and are commonly referred to as Cottrell precipitators. As shown in the drawing, the chlorine gas containing finely divided uranium pentachloride passes from the line 175 through a joint 411 into an extension 412 on a cap 413 of the precipitating device. Since this cap serves as an insulator it is, for example, constructed of glass or other ceramic material. The cap is cemented in a gastight manner to an electrically conducting tube 414 about 147 to 150 centimeters long, made of brass, stainless steel, or other suitable metal. The lower end of the tube 414 terminates in a collar and flange device 415. Extending through a seal 416 in the cap 413 is a central wire 417, preferably of Nichrome, which serves as the other electrode of the separator. In passing down the tube 414 the dust particles in the chlorine gas become electrically charged in the field existing between the wire 417 and the tube 414, and move to and collect on the interior surface of the tube 414 in accordance with the well-known operation of these devices. From this surface the particles drop, upon jarring or scraping, into a collector 418 held in a gastight manner against the flange 415 by means of a frame comprising a bottom plate 419 and a series of bolts 420 coacting with thumb nuts 421. In order to insure proper insulation and spacing of the wire 417 within the tube 414, the collector 418 has a centrally located well 422 of glass or other insulating substance twenty-five to thirty centimeters long cemented to its bottom. In this well is located a lead weight 423 weighing about 3.5 pounds to which is secured the lower end of the wire 417. This weight is free to move vertically so that the same tension of the wire is maintained even though the wire may expand or contract with temperature changes. The electrical connections for impressing voltages between the wire 417 and the tube 414 are shown at 427 and 424, respectively. The separator operates on 25,000 volts D. C. supplied, as indicated in the wiring diagram, by two 110 volt A. C. transformers 431 and 432 and a rectifying device 433. As the circulated chlorine gas approaches the bottom of the tube 414 it is sufficiently purified for re-use and leaves this tube through a lateral extension 425 passing through a plug 426 into the pump intake 125.

Considering now the manufacturing operation, a container 57 charged with uranium tetrachloride is connected to the feeder and, following a purge of the apparatus to remove moisture, etc., if found desirable, a flow of chlorine through the apparatus is set up by running the blower 111. The pulverulent raw material falls from the container by gravity into the feeder tube 51 and is moved by regulated rotation of the helix 52 in a continuous stream over the exit tube 54 into which it drops at the desired rate. Falling onto the helix 17 it is moved into the zone within the heater coil 12. Heating in this zone causes the reaction between the uranium tetrachloride and the chlorine with which it is surrounded to take place and the resultant uranium pentachloride to volatilize. The flow of chlorine carries the volatilized material out of the reaction zone toward the cooler portion of the reaction vessel adjacent the exit 22 where it condenses and passes through the tube 22 into the receiver 171. Since some of the condenser material in the form of a dust frequently does not settle out at this place, the fluid stream is then passed to a dust-separating device such as that illustrated in one of Figs. 2, 3 and 4. After separation of the uranium pentachloride the chlorine returns through the line 125 to the intake side of the blower 111 where it intermingles with fresh replacement chlorine from the line 127.

For an apparatus capable of delivering about 135 to 150 grams of uranium pentachloride per hour, a Pyrex glass reaction tube 10 about 1½ inches in diameter and 12 inches long is suitable. The feeder should be capable of introducing about 140 grams of uranium tetrachloride per hour. The collector 171, preferably made of glass, should have a volume of at least four and preferably about twelve liters. The uranium tetrachloride should be fed into the reactor at a rate of 140 grams per hour and the chlorine gas should circulate through the closed system at the rate of about 300 to 350 liters per hour under a pressure of at least 0.5 and preferably about four inches of carbon tetrachloride (approximately 0.47 inch Hg). For practical operation the uranium tetrachloride should preferably have a purity of at least 97 per cent. For an operation of this scale with an electrostatic precipitator the collection vessel at the bottom of the separator should have a volume of about four liters.

Depending upon the speed of the reaction or conversion, the capacity or desired rate of operation of the particular apparatus, the efficiency of the dust separating device, etc., the gas velocity may be varied considerably and still bring about profitable operation. Very satisfactory operations have been carried out within the range 80 to 1000 liters per hour. Slower gas movement is possible but is accompanied by a loss in efficiency, economy, etc. If the gas circulates too rapidly some of the uranium tetrachloride is carried into the collector, causing the purity of the reaction product to drop. The usual purity of 99.5+ per cent has, in a few runs, fallen to as low as 95 per cent because of this factor.

There is little tendency for the relatively volatile uranium pentachloride to move from the heated zone to the cooler portions of the reaction vessel in the absence of a current of gas. Accordingly, to increase the velocity of uranium pentachloride formation and separation, chloride gas under pressure in greater amounts than that required for the reaction is supplied at such places as will cause a sweeping action from over the reaction mass to the exit tube 22, with recirculation of the excess chlorine. In an attempt to avoid the necessity for the recirculation of unused chlorinating gas, runs were made in which some of the chlorinating gas was replaced with carbon dioxide and air. When these gases were introduced into the chlorine stream in order to assist in sweeping the uranium pentachloride from the reaction zone, the product became somewhat more difficult to handle, indicating that the process operates more efficiently with the undiluted chlorinating gas.

As a raw material, uranium tetrachloride of approximately 100 per cent purity is preferred. The optimum operating temperature is about 560° C. as measured on the external surface of the glass reaction vessel, but good results may be obtained in the temperature range 500°–600° C. Temperatures in the range of 520° to 550° C., and more particularly a temperature of approximately 520° C., also represent satisfactory operating temperatures. The internal temperature may be a few degrees lower than this, but as the chlorinating gas is quickly heated the difference is not considered material.

If the gas flow is slow enough and the receiver 171 large enough, most of the uranium pentachloride dust will settle out therein, with the result that the apparatus for purifying the chlorinating gas for recirculation is of small value. For the separation of the final traces of uranium pentachloride dust from the gas issuing from the receiver the long horizontal settling tube arrangement illustrated in Fig. 2 has been found to be most satisfactory. Each of the separating devices has certain advantages, however, and the selection of the one to be used depends somewhat upon the conditions encountered where the apparatus is set up. The uranium pentachloride dust recovery is practically 100 per cent with the Cottrell-type separator. In one particular run, 463 grams of uranium tetrachloride of 98 per cent purity was processed in 3.25 hours. Uranium pentachloride of 99.8 per cent purity was obtained. Three hundred seventy-one grams of the reaction product were collected in the receiver and 133 grams in the receiver of the electrostatic separation device, making a total of 504 grams of product. In another run 473 grams of 98 per cent uranium tetrachloride were processed in three hours, giving a uranium pentachloride of 99.2 per cent purity.

Dilution of the chlorine with carbon dioxide brought no improvement in the operation. Dilution with air was no better.

Many of the advantages of the previously described apparatus and process will be apparent from the description and drawing. Particular attention may, however, be directed to certain features. The helix in the reaction chamber keeps the raw material from piling up under the feeding adit. It also helps in the heat exchange in the reaction zone by mixing and turning over the particles of the advancing mass of reactant. This helix terminates short of the exit duct, thereby avoiding the dumping of unreacted starting material into the product receiver. The chlorinating gas is admitted at different places in the apparatus in order to keep the passages clear. The volatile uranium pentachloride formed in the reaction zone is carried by the current of chlorinating gas toward the exit duct so that the powder which quickly forms on cooling will fall into the receiver.

In the foregoing description, wherever reference is made to a "joint" it will be understood that this is in reference to a readily separable gastight joint unless indicated otherwise by the context.

Probably many apparently widely different embodiments of this invention may be made without departing from the principle, breadth and spirit thereof and it is to be understood, therefore, that this invention is not limited to the specific embodiments thereof except as encompassed in the claims.

What is claimed is:

1. A process of producing uranium pentachloride comprising simultaneously agitating and heating to about 500° to 600° C. uranium tetrachloride in an environment of chlorine, and separating the uranium pentachloride thereby produced.

2. A process of manufacturing uranium pentachloride comprising agitating and heating a mixture of uranium tetrachloride and chlorine, and isolating uranium pentachloride.

3. In the production of uranium pentachloride the step of passing a stream of chlorine gas concurrent with a moving stream of finely divided uranium tetrachloride through a heated reaction zone, and separating the uranium pentachloride thereby produced.

4. In the manufacture of uranium pentachloride the steps of heating and simultaneously breaking up the surface of a stream of fine crystals of uranium tetrachloride while conducting them through an atmosphere of chlorine, and separating the uranium pentachloride.

5. The process which comprises passing small uranium tetrachloride particles through a chlorine environment while heating them to 520° to 550° C., whereby uranium pentachloride is produced, and separating the uranium pentachloride thereby produced.

6. The process which comprises feeding granulous uranium tetrachloride of not less than 97% purity into a zone heated to approximately 560° C. while maintaining a flow of chlorine gas through the zone, whereby uranium pentachloride is formed and volatilized, conducting the mixture of chlorine gas and volatilized uranium pentachloride into a zone of lower temperature to condense the uranium pentachloride, passing the chlorine containing condensed uranium pentachloride into a receiver to separate the two, and passing the chlorine through a separator to remove the remaining suspended uranium pentachloride.

7. The process which comprises feeding granulous uranium tetrachloride of about 100% purity into a zone heated to approximately 560° C. while maintaining a current of chlorine gas over the stream of heated uranium tetrachloride, whereby uranium pentachloride is formed and volatilized, conducting the mixture of chlorine gas and volatilized uranium pentachloride out of the heated zone to condense the uranium pentachloride, passing the chlorine containing condensed uranium pentachloride into a large chamber to separate the two, passing the chlorine through a separator to remove the remainder of the suspended uranium pentachloride, and passing the purified chlorine over a fresh quantity of uranium tetrachloride.

8. The process which comprises passing small uranium tetrachloride particles through a chlorine environment in a reaction zone while heating them to 520° to 550° C., whereby uranium pentachloride is produced and vaporized, condensing and separating uranium pentachloride from the gaseous effluent leaving the reaction zone, and thereafter scrubbing the gaseous effluent to remove the last traces of residual uranium pentachloride therefrom.

9. The process which comprises passing small uranium tetrachloride particles through a chlorine environment in a reaction zone while heating them to 520° to 550° C., whereby uranium pentachloride is produced and vaporized, condensing and separating uranium pentachloride from the gaseous effluent leaving the reaction zone, and thereafter scrubbing the gaseous effluent with carbon tetrachloride to remove the last traces of residual uranium pentachloride therefrom.

10. The process which comprises passing small uranium tetrachloride particles through a chlorine environment in a reaction zone while heating them to 520° to 550° C., whereby uranium pentachloride is produced and vaporized, condensing and separating uranium pentachloride from the gaseous effluent leaving the reaction zone, and thereafter electrostatically separating the last traces of residual uranium pentachloride from the gaseous effluent.

11. A process of producing uranium pentachloride comprising simultaneously agitating and heating to about 500° to 600° C. uranium tetrachloride in a reaction zone having an environment of chlorine, thereby producing uranium pentachloride in vapor phase, condensing and separating the major portion of the uranium pentachloride from the vapor phase material leaving the reaction zone, and thereafter electrostatically separating residual uranium pentachloride from the vapor phase material leaving the reaction zone.

References Cited in the file of this patent

UNITED STATES PATENTS

| | | |
|---|---|---|
| 280,670 | Warren et al. | Apr. 3, 1888 |
| 405,868 | Bartlett | July 16, 1889 |
| 666,657 | Fischer | Jan. 29, 1901 |
| 695,037 | Craig | Mar. 11, 1902 |
| 2,021,991 | Depew | Nov. 26, 1935 |

OTHER REFERENCES

Mellor: "Comprehensive Treatise on Inorganic and Theoretical Chemistry," vol. 12, 1932, pages 83 and 84.